(12) United States Patent
Hunter

(10) Patent No.: US 8,915,774 B1
(45) Date of Patent: Dec. 23, 2014

(54) PORTABLE GAME CARCASS HANGER

(71) Applicant: John L. Hunter, Millfield, OH (US)

(72) Inventor: John L. Hunter, Millfield, OH (US)

(*) Notice: Subject to any disclaimer, the term of this patent is extended or adjusted under 35 U.S.C. 154(b) by 0 days.

(21) Appl. No.: 14/211,768

(22) Filed: Mar. 14, 2014

(51) Int. Cl.
*A22C 21/00* (2006.01)
*A22B 5/06* (2006.01)

(52) U.S. Cl.
CPC .................................... *A22B 5/06* (2013.01)
USPC .......................................................... 452/187

(58) Field of Classification Search
USPC ........................................ 452/185, 187–192
See application file for complete search history.

(56) References Cited

U.S. PATENT DOCUMENTS

| | | | |
|---|---|---|---|
| 6,062,974 A * | 5/2000 | Williams | 452/187 |
| 6,695,688 B1 * | 2/2004 | Owen et al. | 452/187 |
| 7,314,406 B2 * | 1/2008 | Bilinovich | 452/185 |
| 7,341,507 B1 * | 3/2008 | Julian, Sr. | 452/192 |
| 7,476,149 B2 * | 1/2009 | Burrows | 452/187 |
| 7,544,120 B1 | 6/2009 | Tardif et al. | |
| 7,625,269 B2 | 12/2009 | Godwin | |
| 7,913,980 B1 * | 3/2011 | Cipriano | 254/393 |

* cited by examiner

*Primary Examiner* — Richard Price, Jr.
(74) *Attorney, Agent, or Firm* — Crossley Patent Law

(57) ABSTRACT

A portable portable game carcass hanger including two mounting strap with fastening devices to secure to a vertical support beam such as a tree trunk. A mounting bracket with a first leg, a second leg perpendicular to the first leg and support member are provided. A first hook is disposed on the second leg. There is a triangular hanger with an apex and a bottom end opposite the apex. The apex removably engages the second leg first hook. The bottom end of the triangular hanger has at least one second hook provided to hang at least one game carcass thereon.

3 Claims, 4 Drawing Sheets

PORTABLE GAME CARCASS HANGER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of game carcass hangers are known in the prior art. However, what is needed is a portable game carcass hanger including two mounting strap with fastening devices to secure to a vertical support beam such as a tree trunk. A mounting bracket with a first leg, a second leg perpendicular to the first leg and support member are provided. A first hook is disposed on the second leg. There is a triangular hanger with an apex and a bottom end opposite the apex. The apex removably engages the second leg first hook. The bottom end of the triangular hanger has at least one second hook provided to hang at least one game carcass thereon. The present device provides a secure, easily assembled device to hang the game carcass thereon allowing a user to skin a carcass without the need of an additional person while keeping the carcass free of debris and off of the ground.

FIELD OF THE INVENTION

The present invention relates to game carcass hangers and weighing apparatus, and more particularly, to a portable game carcass hanger which is portable and can be attached to any vertical support body including a tree trunk.

SUMMARY OF THE INVENTION

The general purpose of the present portable game carcass hanger, described subsequently in greater detail, is to provide a portable game carcass hanger which has many novel features that result in a portable game carcass hanger which is not anticipated, rendered obvious, suggested, or even implied by prior art, either alone or in combination thereof.

To accomplish this, the present portable game carcass hanger includes a first mounting strap having a first end and second end. There is a second mounting strap identical to the first mounting strap.

A fastening device, such as a cam buckle, is disposed on the first end of each of the first and second mounting straps. The second end of each of the first and second mounting straps is configured to securingly engage the respective fastening device. Each of the first and second mounting straps is configured to wrap around a vertical support body such as a tree trunk or a pole.

There is a mounting bracket with a first leg having a first side and a second side perpendicular to the first side. Each of the first side and the second side has an upper end and a lower end. The first side further has a rear side. A second leg is disposed on the first leg upper end in a position perpendicular to the first leg. The second leg has a proximal end and a distal end.

A first slot is disposed in the upper end of the second side of the mounting bracket first leg. A second slot is disposed in the lower end of the second side of the mounting bracket first leg. Each of the first slot and the second slot is configured to securingly receive the respective first and second mounting strap therethough.

A support member having a back plate is disposed on the first leg rear side. The back plate has a bottom end. A bottom plate is disposed on the back plate bottom end in a position perpendicular to the back plate. The second side lower end is disposed on the bottom end. The second strap is disposed immediately adjacent the entire back plate providing additional support of the device.

A threaded first hook, such as a J-bolt, is removably disposed on the distal end of the second leg. There is a triangular hanger with an apex and a bottom end opposite the apex. The apex engages the first hook. The triangular hanger provides a balanced hanger. At least one second hook is removably disposed on the bottom end of the hanger. The at least one second hook is configured to permit the hanging of at least one game carcass thereon, allowing a user to skin a carcass without the need of an additional person while keeping the carcass free of debris.

Thus has been broadly outlined the more important features of the present portable game carcass hanger so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
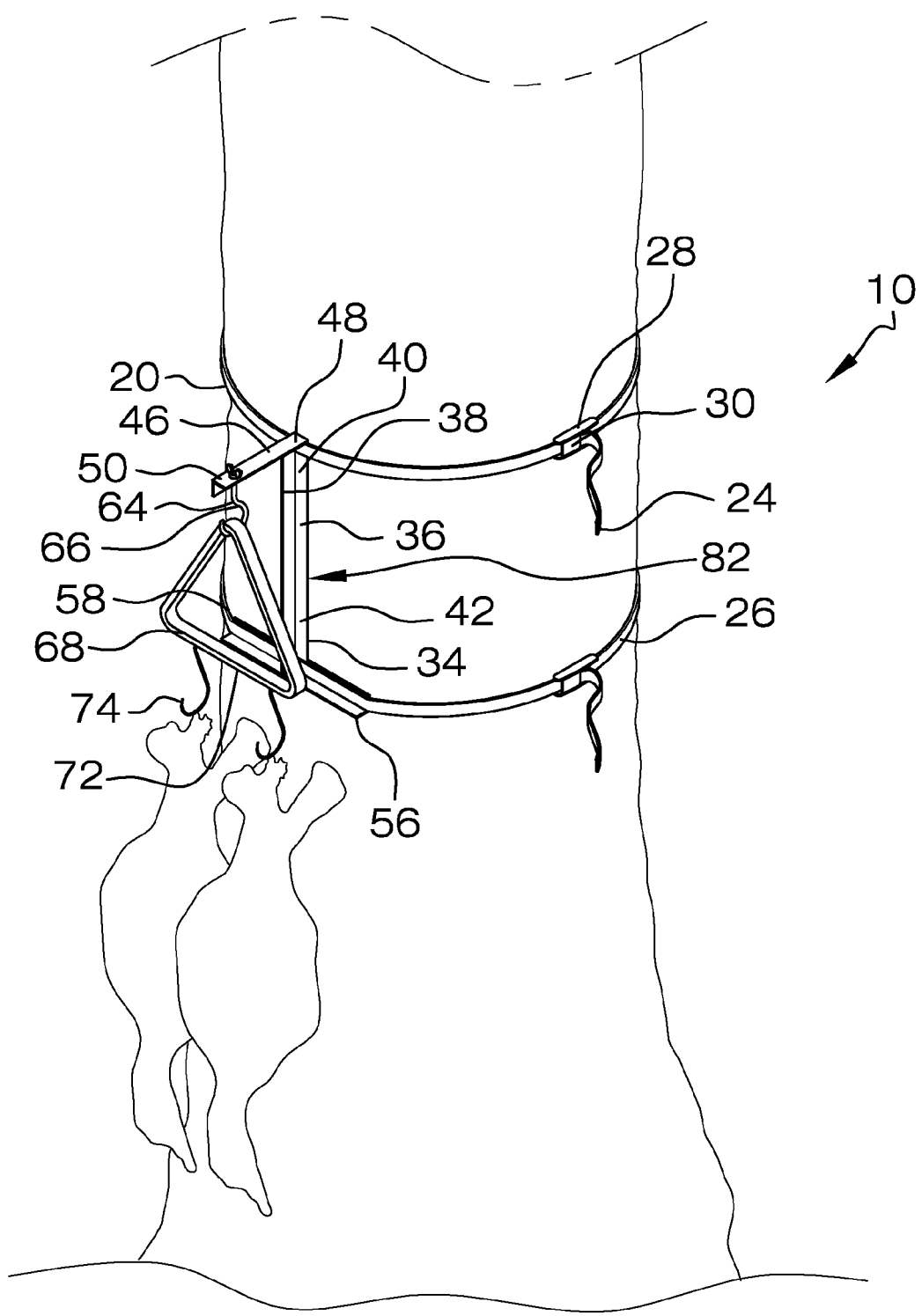
FIG. 1 is an in-use isometric view.
Figure 2:
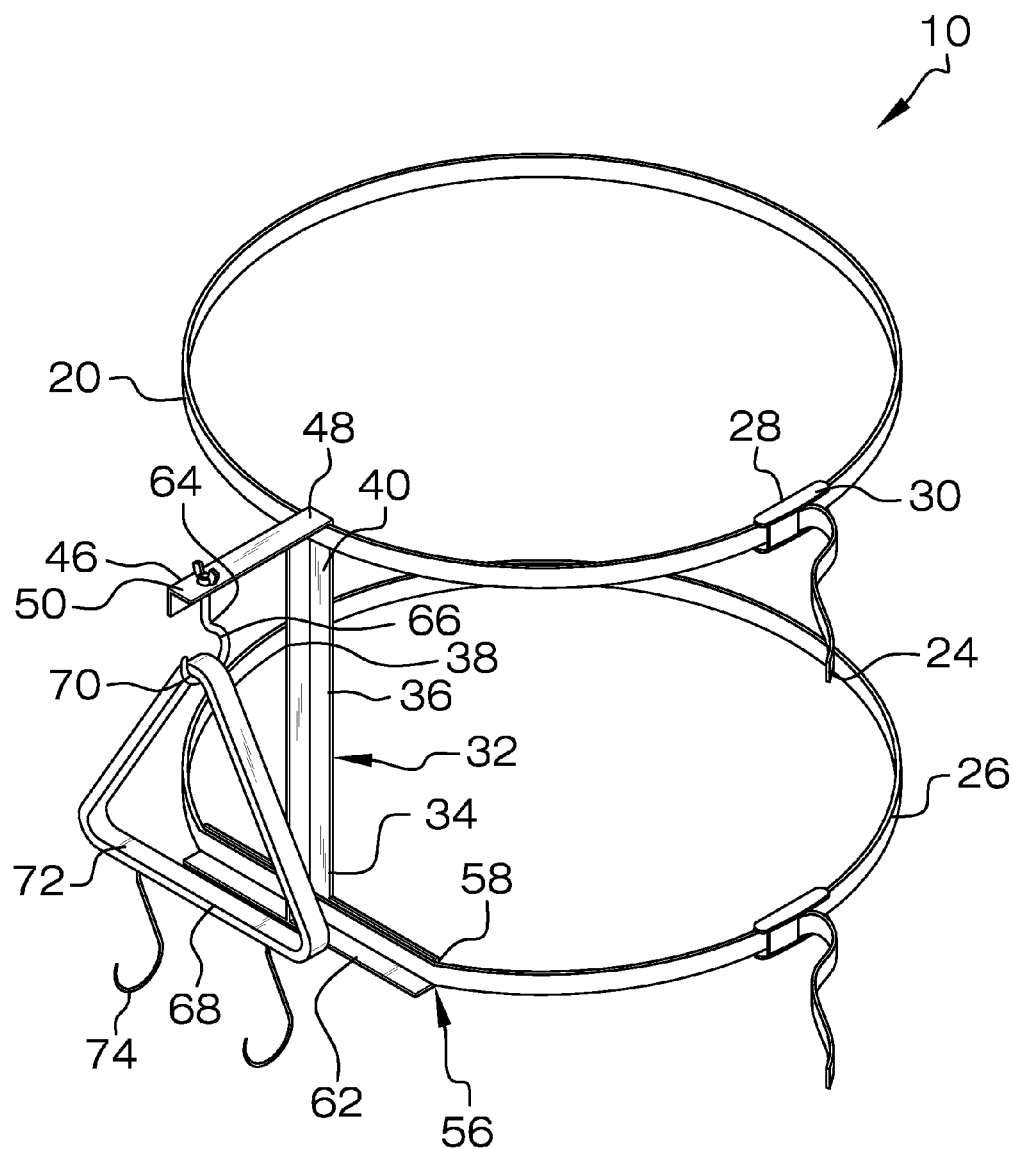
FIG. 2 is an isometric view.
Figure 4:
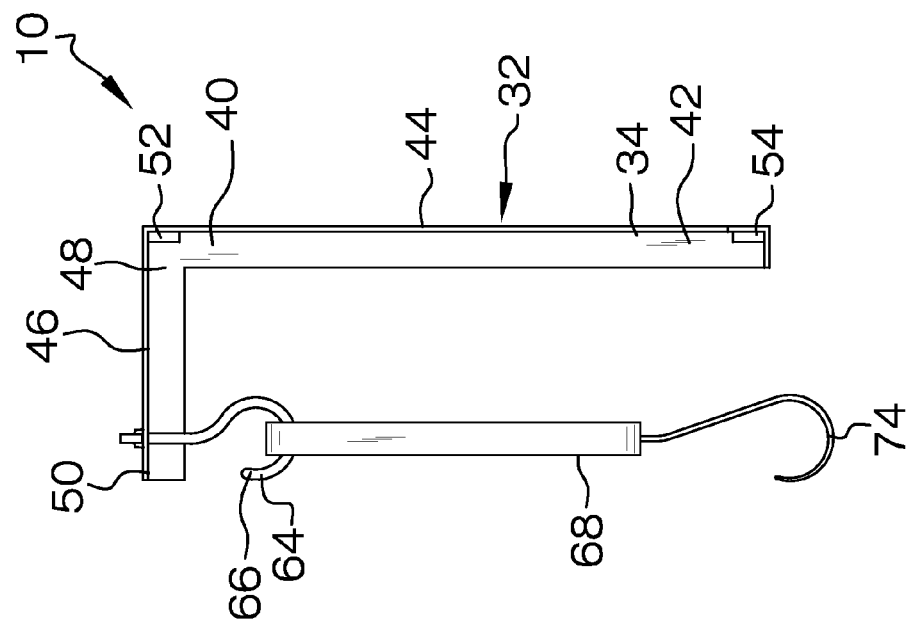
FIG. 4 is a side elevation view.
Figure 3:
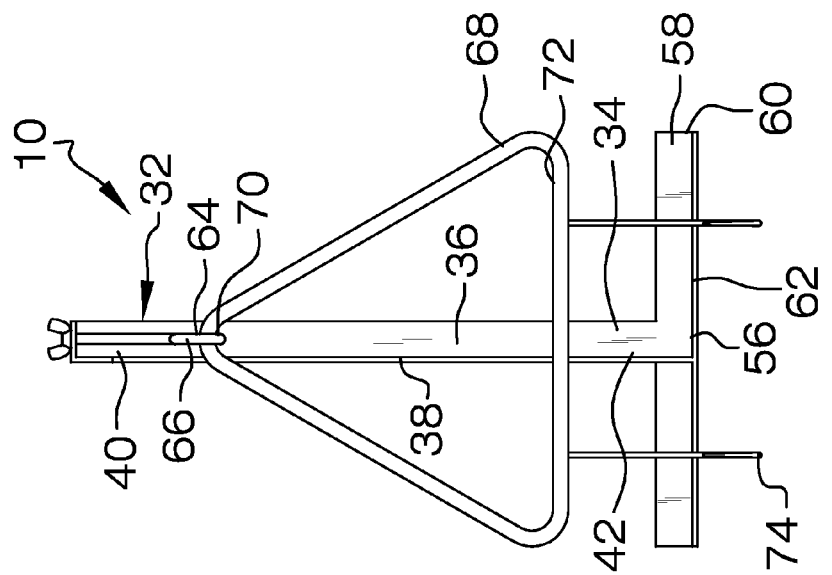
FIG. 3 is a front elevation view.
Figure 5:
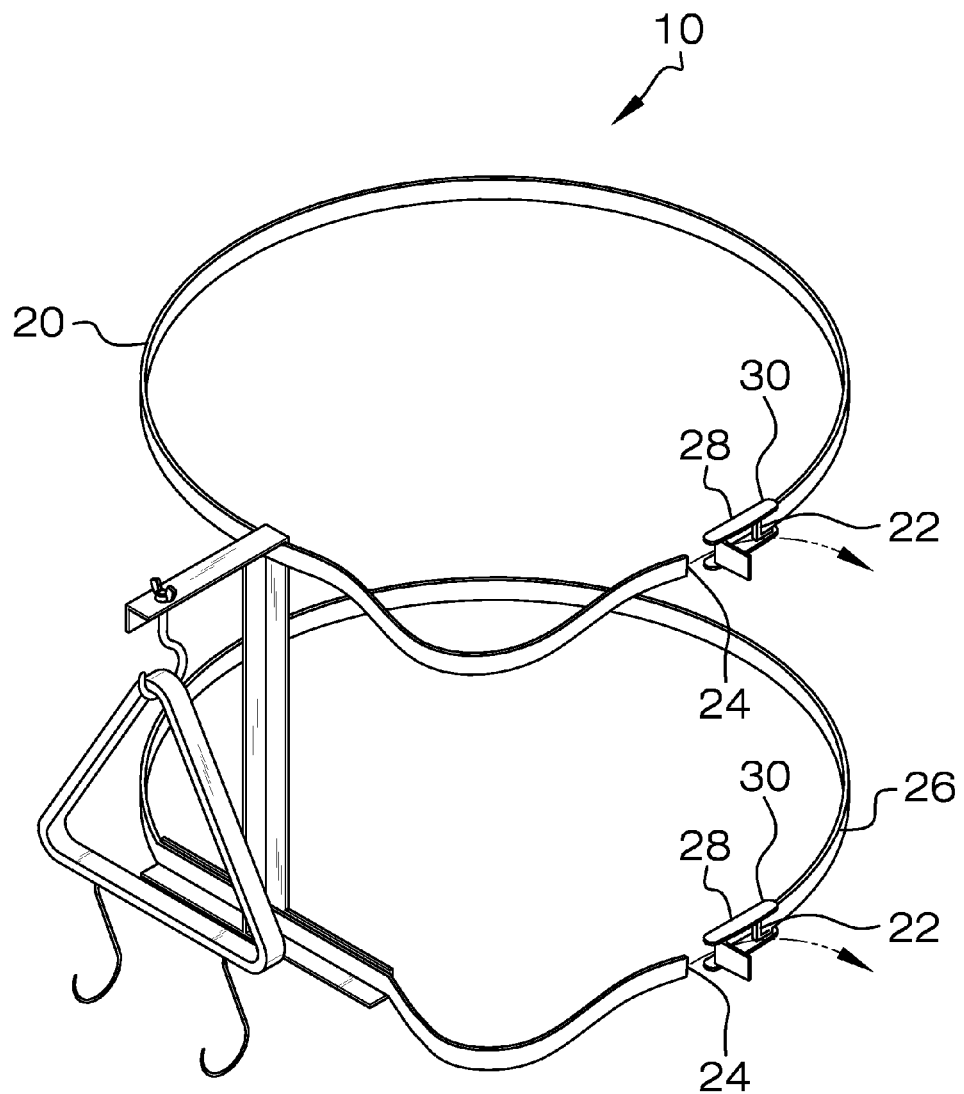
FIG. 5 is an exploded view

With reference now to the drawings, and in particular FIGS. 1 through 5 thereof, an example of the instant portable game carcass hanger employing the principles and concepts of the present portable game carcass hanger and generally designated by the reference number 10 will be described.

Referring to FIGS. 1 through 5 the present portable game carcass hanger 10 is illustrated. The portable game carcass hanger 10 includes a first mounting strap 20 having a first end 22 and second end 24. There is a second mounting strap 26 identical to the first mounting strap 20.

A fastening device 28, such as a cam buckle 30, is disposed on the first end 22 of each of the first and second mounting straps 20, 26. The second end 24 of each of the first and second mounting straps 20, 26 is configured to securingly engage the respective fastening device 28. Each of the first and second mounting straps 20, 26 is configured to wrap around a vertical support body such as a tree trunk or a pole.

There is a mounting bracket 32 with a first leg 34 having a first side 36 and a second side 38 perpendicular to the first side 36. Each of the first side 36 and the second side 38 has an upper end 40 and a lower end 42. The first side 36 further has a rear side 44. A second leg 46 is disposed on the first leg 34 upper end 40 in a position perpendicular to the first leg 34. The second leg 46 has a proximal end 28 and a distal end 50.

A first slot 52 is disposed in the upper end 40 of the second side 38 of the mounting bracket 32 first leg 34. A second slot 54 is disposed in the lower end 42 of the second side 38 of the mounting bracket 32 first leg 34. Each of the first slot 52 and the second slot 54 is configured to securingly receive the respective first and second mounting strap 20, 26 therethough.

A support member 56 having a back plate 58 is disposed on the first leg 34 rear side 44. The back plate 58 has a bottom end 60. A bottom plate 62 is disposed on the back plate 58 bottom end 60 in a position perpendicular to the back plate 58. The first leg 34 second side 38 lower end 42 is disposed on the bottom plate 62. The second mounting strap 26 is disposed immediately adjacent the entire back plate 58 providing additional support of the device 10.

A threaded first hook 64 such as a J-bolt 68 is removably disposed on the distal end 50 of the second leg 46. There is a triangular hanger 68 with an apex 70 and a bottom end 72 opposite the apex 70. The apex 70 engages the first hook 64. The triangular hanger 68 provides a balanced hanging surface. At least one second hook 74 is removably disposed on the bottom end 60 of the hanger 68. The at least one second hook 74 is configured to permit the hanging of at least one game carcass thereon, allowing a user to skin a carcass without the need of an additional person while keeping the carcass free of debris and off of the ground.

What is claimed is:

1. A portable game carcass hanger comprising:
    a first mounting strap having a first end and second end;
    a second mounting strap identical to the first mounting strap;
    a cam buckle disposed on the first end of each of the first and second mounting straps;
    wherein the second end of each of the first and second mounting straps is configured to securingly engage the respective fastening device;
    wherein each of the first and second mounting straps is configured to wrap around a vertical support body;
    a mounting bracket comprising:
        a first leg having a first side, a second side perpendicular to the first side, each of the first side and the second side having an upper end and a lower end, the first side further having a rear side;
        a second leg disposed on the first leg upper end in a position perpendicular to the first leg, the second leg having a proximal end and a distal end;
        a first slot disposed in the upper end of the second side of the mounting bracket first leg;
        a second slot disposed in the lower end of the second side of the mounting bracket first leg;
        a support member having a back plate disposed on the first leg rear side, the back plate having a bottom end, and a bottom plate disposed on the back plate bottom end in a position perpendicular to the back plate wherein the first leg second side lower end is disposed on the bottom plate;
        wherein each of the first slot and the second slot is configured to securingly receive the respective first and second mounting strap therethough;
    a threaded first hook removably disposed on the distal end of the second leg;
    a triangular hanger having an apex and a bottom end opposite the apex; and
    at least one second hook removably disposed on the bottom end of the hanger;
    wherein the apex removably engages the first hook;
    wherein the at least one second hook is configured to permit the hanging of at least one game carcass thereon; and
    wherein the second strap is disposed immediately adjacent the entire back plate.

2. The portable game carcass hanger of claim 1 wherein the first hook is a J-bolt.

3. A portable game carcass hanger comprising:
    a first mounting strap having a first end and second end;
    a second mounting strap identical to the first mounting strap;
    a fastening device disposed on the first end of each of the first and second mounting straps;
    wherein the second end of each of the first and second mounting straps is configured to securingly engage the respective fastening device;
    wherein each of the first and second mounting straps is configured to wrap around a vertical support body;
    a mounting bracket comprising:
        a first leg having a first side, a second side perpendicular to the first side, each of the first side and the second side having an upper end and a lower end, the first side further having a rear side;
        a second leg disposed on the first leg upper end in a position perpendicular to the first leg, the second leg having a proximal end and a distal end;
        a first slot disposed in the upper end of the second side of the mounting bracket first leg;
        a second slot disposed in the lower end of the second side of the mounting bracket first leg;
        a support member having a back plate disposed on the first leg rear side, the back plate having a bottom end, and a bottom plate disposed on the back plate bottom end in a position perpendicular to the back plate wherein the first leg second side lower end is disposed on the bottom plate;
        wherein each of the first slot and the second slot is configured to securingly receive the respective first and second mounting strap therethough;
    a threaded first hook removably disposed on the distal end of the second leg;
    a triangular hanger having an apex and a bottom end opposite the apex; and
    at least one second hook removably disposed on the bottom end of the hanger;
    wherein the apex removably engages the first hook;
    wherein the at least one second hook is configured to permit the hanging of at least one game carcass thereon;
    wherein the second strap is disposed immediately adjacent the entire back plate;
    wherein the first hook is a J-bolt; and
    wherein the fastening device is a cam buckle.

* * * * *